US012752217B2

(12) United States Patent
Terry et al.

(10) Patent No.: US 12,752,217 B2
(45) Date of Patent: Oct. 6, 2026

(54) SYSTEM AND METHOD FOR SUBSTANTIALLY HORIZONAL ROTATING REFLUX DISTILLATION APPARATUS

(71) Applicant: Development Technologies LLC, Bothell, WA (US)

(72) Inventors: Daniel J. Terry, Bothell, WA (US); Nick Varela-Terry, Bothell, WA (US); Christopher R. Starling, Monroe, WA (US)

(73) Assignee: Development Technologies LLC, Bothell, WA (US)

( * ) Notice: Subject to any disclaimer, the term of this patent is extended or adjusted under 35 U.S.C. 154(b) by 180 days.

(21) Appl. No.: 18/742,919

(22) Filed: Jun. 13, 2024

(65) Prior Publication Data

US 2025/0381498 A1 Dec. 18, 2025

(51) Int. Cl.
*B01D 3/42* (2006.01)
*B01D 3/30* (2006.01)

(52) U.S. Cl.
CPC .............. *B01D 3/4211* (2013.01); *B01D 3/30* (2013.01)

(58) Field of Classification Search
CPC ................................ B01D 3/30; B01D 3/4211
See application file for complete search history.

(56) References Cited

U.S. PATENT DOCUMENTS 2,671,053 A * 3/1954 Dannenberg ............. B01D 3/00 202/205
2,975,108 A * 3/1961 Watt ......................... B01D 3/30 202/205
3,039,941 A * 6/1962 Sweeney .............. B01D 3/4216 202/160
3,607,662 A * 9/1971 Glover ..................... B01D 3/14 202/205
4,306,940 A * 12/1981 Zenty ........................ B01D 1/28 203/25
5,340,444 A * 8/1994 van der Heijden .. B01D 5/0087 202/205
6,638,397 B1 * 10/2003 Camiener ............ B01D 5/0063 202/185.1
10,898,828 B2 * 1/2021 Adjabeng ............ B01D 5/0006
11,033,832 B1 * 6/2021 McKellar ................. B01D 3/02
(Continued)

*Primary Examiner* — Jonathan Miller
(74) *Attorney, Agent, or Firm* — Seed Intellectual Property Law Group LLP

(57) ABSTRACT

A rotatable, reflux distillation system is disclosed that includes a rotatable, reflux distillation column, a lower end transition pipe, an upper end transition pipe, a rotational drive assembly, and a vapor reduction system. The rotatable, reflux distillation column is angled between 10-20 degrees from horizontal, and has a lower vapor input end and an upper fluid exit end. The lower end of the reflux distillation column is operatively associated with a lower seal housing, and the upper end of the reflux distillation column is operatively associated with an upper seal housing. The lower end transition pipe is operatively associated with the lower end of the reflux distillation column and includes a lower thermocouple, while the upper end transition pipe is operatively associated with the upper end of the reflux distillation column and includes an upper thermocouple and a fluid exit gate. The rotational drive assembly rotates the reflux distillation column. The vapor reduction system reduces the vapor into condensate liquid.

22 Claims, 11 Drawing Sheets

(56) References Cited

U.S. PATENT DOCUMENTS

| | | | | |
|---|---|---|---|---|
| 11,643,601 | B2 * | 5/2023 | Swain | B01D 3/18 202/136 |
| 12,115,475 | B2 * | 10/2024 | Wen | B01D 5/0045 |
| 2022/0049163 | A1 * | 2/2022 | Swain | C10B 19/00 |
| 2025/0381498 | A1 * | 12/2025 | Terry | B01D 3/4211 |

* cited by examiner

SYSTEM AND METHOD FOR SUBSTANTIALLY HORIZONAL ROTATING REFLUX DISTILLATION APPARATUS

BACKGROUND

Technical Field

The present application pertains to systems and methods for ethanol distillation and more particularly, to systems and methods for a substantially horizontal, rotating, reflux distillation apparatus.

Description of the Related Art

The industrial distillation process typically employs a vertical column as the main component of the system. In this regard, the vertical orientation of the column is painstakingly maintained as close to 90 degrees as possible. This ensures that a maximum quantity of the alcohol steam is maintained within the column and not condensed on the sides of the column, since any degree off vertical creates an overhanging surface against which the alcohol steam will condense.

In some embodiments, bubbler plates are then inserted horizontally throughout the height of the vertical column to collect condensate for re-heating and re-introducing inside the vertical column. This methodology, even in very expensive setups typically produces an 80%-86% purity, requiring reintroduction of the condensate for re-distillation.

Accordingly, industrial distillation is usually performed in large, vertical cylindrical columns known as distillation towers with diameters ranging from about 2 feet to about 50 feet, and heights of 300 feet or more. When the process feed has a diverse composition, liquid outlets at intervals up the column allow for the withdrawal of different fractions or products having different boiling points, with the products having the lowest boiling point exit from the top of the columns and the products having the highest boiling point exit from the bottom of the column.

Early forms of distillation involved batch processes using vaporization and condensation. A lower quality distillation technique employes "pot stills" where alcohol vapors are sent through a length of material, across a gravity arch and through a natural or active cooling condensation path. Such pot still distillation technique typically only produces 50-70% purity. Purity was improved by further distillation of the condensate. Greater volumes were processed by simply repeating the distillation. Distillers would then carry out numerous distillation "passes" in order to obtain a pure fluid output.

The maximum achievable purity with ethanol distillation is 95.5% purity in one atmosphere, unpressurized, which is therefore the target goal with any ethanol distillation process. In typical ethanol distillation, this maximum possible distillate of 95.5% is achieved through multiple passthrough of the distillate. It is commonly described as "twice distilled," "three times distilled," and the like, since it is commonly understood that a "still" will only produce a 60, 70, or 80% purity of ethanol in its first passthrough. Thus, the product is re-introduced through the same process repeatedly to improve its percentage (or "proof") with a final purity of 95.5% being difficult to achieve, even with multiple passes.

BRIEF SUMMARY

Briefly stated, embodiments of the present disclosure are directed towards a substantially horizontal, rotatable, reflux distillation system and method. Embodiments broadly include a substantially horizontal, rotatable, reflux distillation column, a lower end transition pipe, an upper end transition pipe, a rotational drive assembly, and a vapor reduction system. In the substantially horizontal, rotatable, reflux distillation column, the term "substantially horizontal" is defined as angled between 10-20 degrees from horizontal. Additionally, the reflux distillation column has a lower end that is a vapor input end and an upper end that is a fluid exit end. The lower end of the reflux distillation column is operatively associated with a lower seal housing that includes inserted seals and bearings. Correspondingly, the upper end of the reflux distillation column is operatively associated with an upper seal housing that includes inserted seals and bearings. The lower end transition pipe is operatively associated with the lower end of the reflux distillation column and the lower seal housing. The lower end transition pipe also includes a lower thermocouple. The upper end transition pipe is operatively associated with the upper end of the reflux distillation column and the upper seal housing. The upper end transition pipe also includes an upper thermocouple and a fluid exit gate.

The fluid exit gate is controlled by dynamic linear feedback temperature control that keeps the fluid exit gate in a closed state until temperature monitoring using the lower thermocouple and the upper thermocouple determines that an entirety of an internal volume of the reflux distillation column is homogenized in an azeotropic temperature state. At this stage, the fluid exit gate moves into an open state until the azeotropic temperature state of the reflux distillation column is no longer maintained, and the fluid exit gate moves back into a closed state. The drive assembly operatively is associated with the reflux distillation column that rotates the reflux distillation column. The vapor reduction system is operatively associated with the upper end transition pipe. The vapor reduction system enables vapor travelling upward in the reflux distillation system to reduce into condensate liquid and returns back downward into the reflux distillation column.

In some embodiments of the reflux distillation system, the term "substantially horizontal" is defined as 12 degrees from horizontal. In another aspect of some embodiments, the reflux distillation column contains packing materials, which add to a surface area inside the column for agitation and condensation. For example, in some embodiments, the packing materials include one or more of copper, stainless rolled mesh, and Raschig rings. In still another aspect of some embodiments, the lower end transition pipe is operatively associated with a distillation boiler. In yet another aspect of some embodiments, the boiler produces vapor that is heated to between 70-100 degrees Celsius, and preferably 95 degrees Celsius. Moreover, in other aspects of some embodiments, the vapor produced by the boiler travels upward in the reflux distillation column towards the condenser system until it cools into condensate, and gravity causes the condensate to travel back downward in the reflux distillation column towards the boiler.

In some embodiments of the reflux distillation system, the drive assembly is operatively associated with the reflux distillation column, and includes one or more of a gear drive and a belt drive to rotate the reflux distillation column. Additionally, in some embodiments, the drive assembly further includes a stepper motor to rotate the reflux distillation column. In another aspect of some embodiments, the drive assembly is operatively associated with the reflux distillation column, and includes a control system to control the rotational speed of the column. In still another aspect of some embodiments, the rotational speed of the reflux distillation column is determined based at least in part by an overall encapsulated volume of a diameter of the reflux distillation column and a length of the reflux distillation column to maximize the vapor in a center of the reflux distillation column. In yet another aspect of some embodiments, the vapor reduction system includes a distribution hub and one or more condenser antennas that connect with the distribution hub. Moreover, in other aspects of some embodiments, the vapor reduction system includes a cooling system that is operatively associated with the one or more condenser antennas, the cooling system including one of more of cooling fins, a liquid cooled conduction system, or a liquid cooled evaporation system.

In some embodiments, the reflux distillation system further includes a closed loop solar heating system that heats the boiler. The closed loop solar heating system includes a solar collector/evacuator, a thermostat, heat transfer coils, a distillation boiler that contains the heat transfer coils, an input heat line that connects the solar collector/evacuator to the distillation boiler, and a return line that connects the distillation boiler back to the solar collector/evacuator. In another aspect of some embodiments, the substantially horizontal, rotatable, reflux distillation system achieves greater than 90% distillation in one pass, and preferably achieves 95.5% distillation in one pass. In still another aspect of some embodiments, the substantially horizontal, rotatable, reflux distillation system is portable and deployable. In yet another aspect of some embodiments, the substantially horizontal, rotatable, reflux distillation system is powered by sugar-containing biological waste materials that are boiled in a distillation boiler.

In some embodiments, the reflux distillation system further includes a filtration chamber that is operatively associated with the fluid exit gate, wherein the filtration chamber contains super absorbent polymers or fibers. In another aspect of some embodiments, the super absorbent polymers or fibers includes polyacrylates that filter out residual water and are resistant to effects of ethanol in the distilled fluid. In another aspect of some embodiments, the super absorbent polymers or fibers are monitorable and replaceable to remove residual water from the distilled fluid. In this manner, the super absorbent polymer filters are monitorable in that they may be monitored (either visually or with sensors) to determine when they have reached, or are approaching, the end of their useful life span. Additionally, the super absorbent polymer filters are replaceable in that the used filtration polymers may be swapped with new filtration polymers.

In other embodiments, one or more methods for distillation using a substantially horizontal, rotatable, reflux distillation system are disclosed. The one or more methods include: providing a substantially horizontal, reflux distillation column, wherein substantially horizontal is defined as angled between 10-20 degrees from horizontal, wherein the reflux distillation column has a lower end that is an input end and an upper end that is an exit end, wherein the lower end of the reflux distillation column is operatively associated with a lower seal housing, and wherein the upper end of the reflux distillation column is operatively associated with an upper seal housing; connecting a lower end transition pipe to the lower end of the reflux distillation column and the lower seal housing, the lower end transition pipe including a lower thermocouple; connecting an upper end transition pipe to the upper end of the reflux distillation column and the upper seal housing, the upper end transition pipe including an upper thermocouple and a fluid exit gate; connecting a vapor reduction system to the upper end transition pipe, wherein the vapor reduction system enables vapor travelling upward in the reflux distillation system to reduce into condensate liquid and return back downward into the reflux distillation column; rotating the substantially horizontal, reflux distillation column using a drive assembly; controlling the fluid exit gate using dynamic linear feedback temperature control that keeps the fluid exit gate in a closed state until the lower thermocouple and the upper thermocouple determine that an entirety of an internal volume of the reflux distillation column is homogenized in an azeotropic temperature state, at which point the fluid exit gate moves into an open state; and controlling the fluid exit gate using dynamic linear feedback temperature control that keeps the fluid exit gate in the open state until the azeotropic temperature state of the reflux distillation column is no longer maintained, at which point the fluid exit gate moves back into the closed state.

In some embodiments of the reflux distillation method, the term "substantially horizontal" is defined as 12 degrees from horizontal. In another aspect of some embodiments, the reflux distillation column contains packing materials, which add to the surface area inside the column for agitation and condensation. For example, in some embodiments, the packing materials include one or more of copper, stainless rolled mesh, and Raschig rings. In still another aspect of some embodiments, the lower end transition pipe is operatively associated with a distillation boiler. In yet another aspect of some embodiments, the boiler produces vapor that is heated to between 70-100 degrees Celsius, and preferably 95 degrees Celsius. Moreover, in other aspects of some embodiments, the vapor produced by the boiler travels upward in the reflux distillation column towards the condenser system until it cools into condensate, and gravity causes the condensate to travel back downward in the reflux distillation column towards the boiler.

In some embodiments of the reflux distillation method, the drive assembly is operatively associated with the reflux distillation column, and includes one or more of a gear drive and a belt drive to rotate the reflux distillation column. Additionally, in some embodiments, the drive assembly further includes a stepper motor to rotate the reflux distillation column. In another aspect of some embodiments, the drive assembly is operatively associated with the reflux distillation column, and includes a control system to control the rotational speed of the column. In still another aspect of some embodiments, the rotational speed of the reflux distillation column is determined based at least in part by an overall encapsulated volume of a diameter of the reflux distillation column and a length of the reflux distillation column to maximize the vapor in a center of the reflux distillation column. In yet another aspect of some embodiments, the vapor reduction system includes a distribution hub and one or more condenser antennas that connect with the distribution hub. Moreover, in other aspects of some embodiments, the vapor reduction system includes a cooling system that is operatively associated with the one or more condenser antennas, the cooling system including one of more of cooling fins, a liquid cooled conduction system, or a liquid cooled evaporation system.

In some embodiments, the reflux distillation method further includes a closed loop solar heating system that heats the boiler. The closed loop solar heating system includes a solar collector/evacuator, a thermostat, heat transfer coils, a distillation boiler that contains the heat transfer coils, an input heat line that connects the solar collector/evacuator to the distillation boiler, and a return line that connects the distillation boiler back to the solar collector/evacuator. In another aspect of some embodiments, the substantially horizontal, rotatable, reflux distillation system achieves greater than 90% distillation in one pass, and preferably achieves 95.5% distillation in one pass. In still another aspect of some embodiments, the substantially horizontal, rotatable, reflux distillation system is portable and deployable. In yet another aspect of some embodiments, the substantially horizontal, rotatable, reflux distillation system is powered by sugar-containing biological waste materials that are boiled in the distillation boiler.

In some embodiments, the reflux distillation system further includes a filtration chamber that is operatively associated with the fluid exit gate, wherein the filtration chamber contains super absorbent polymers or fibers. In another aspect of some embodiments, the super absorbent polymers or fibers includes polyacrylates that filter out residual water and are resistant to effects of ethanol in the distilled fluid. In another aspect of some embodiments, the super absorbent polymers or fibers are monitorable and replaceable to remove residual water from the distilled fluid. In this manner, the super absorbent polymer filters are monitorable in that they may be monitored (either visually or with sensors) to determine when they have reached, or are approaching, the end of their useful life span. Additionally, the super absorbent polymer filters are replaceable in that the used filtration polymers may be swapped with new filtration polymers.

Still other embodiments disclose an oblique-angled, rotatable, reflux distillation system that includes an oblique-angled, rotatable, reflux distillation column, a lower end transition pipe, an upper end transition pipe, a rotational drive assembly, and a vapor reduction system. In the oblique angled, rotatable, reflux distillation column, the term "oblique angled" is defined as angled between 10-20 degrees from horizontal. The reflux distillation column has a lower end that is a vapor input end and an upper end that is a fluid exit end. The lower end of the reflux distillation column is operatively associated with a lower seal housing. The upper end of the reflux distillation column is operatively associated with an upper seal housing. The lower end transition pipe is operatively associated with the lower end of the reflux distillation column and the lower seal housing. The lower end transition pipe also includes a lower temperature measurement device. The upper end transition pipe is operatively associated with the upper end of the reflux distillation column and the upper seal housing. The upper end transition pipe also includes an upper temperature measurement device and a fluid exit gate. The rotational drive assembly is operatively associated with the reflux distillation column that rotates the reflux distillation column. The vapor reduction system is operatively associated with the upper end transition pipe. The vapor reduction system causes vapor travelling upward in the reflux distillation system to reduce into condensate liquid and return back downward into the reflux distillation column. The distilled fluid only exits the reflux distillation system out of the fluid exit gate when an azeotropic temperature state has been reached within the reflux distillation column, as determined by the lower and upper temperature measurement devices.

In some embodiments of the reflux distillation system, the term "substantially horizontal" is defined as 12 degrees from horizontal. In another aspect of some embodiments, the reflux distillation column contains packing materials, which add to the surface area inside the column for agitation and condensation. For example, in some embodiments, the packing materials include one or more of copper, stainless rolled mesh, and Raschig rings. In still another aspect of some embodiments, the lower end transition pipe is operatively associated with a distillation boiler. In yet another aspect of some embodiments, the boiler produces vapor that is heated to between 70-100 degrees Celsius, and preferably 95 degrees Celsius. Moreover, in other aspects of some embodiments, the vapor produced by the boiler travels upward in the reflux distillation column towards the condenser system until it cools into condensate, and gravity causes the condensate to travel back downward in the reflux distillation column towards the boiler.

In some embodiments of the reflux distillation system, the drive assembly is operatively associated with the reflux distillation column, and includes one or more of a gear drive and a belt drive to rotate the reflux distillation column. Additionally, in some embodiments, the drive assembly further includes a stepper motor to rotate the reflux distillation column. In another aspect of some embodiments, the drive assembly is operatively associated with the reflux distillation column, and includes a control system to control the rotational speed of the column. In still another aspect of some embodiments, the rotational speed of the reflux distillation column is determined based at least in part by an overall encapsulated volume of a diameter of the reflux distillation column and a length of the reflux distillation column to maximize the vapor in a center of the reflux distillation column. In yet another aspect of some embodiments, the vapor reduction system includes a distribution hub and one or more condenser antennas that connect with the distribution hub. Moreover, in other aspects of some embodiments, the vapor reduction system includes a cooling system that is operatively associated with the one or more condenser antennas, the cooling system including one of more of cooling fins, a liquid cooled conduction system, or a liquid cooled evaporation system.

In some embodiments, the reflux distillation system further includes a closed loop solar heating system that heats the boiler. The closed loop solar heating system includes a solar collector/evacuator, a thermostat, heat transfer coils, a distillation boiler that contains the heat transfer coils, an input heat line that connects the solar collector/evacuator to the distillation boiler, and a return line that connects the distillation boiler back to the solar collector/evacuator. In another aspect of some embodiments, the substantially horizontal, rotatable, reflux distillation system achieves greater than 90% distillation in one pass, and preferably achieves 95.5% distillation in one pass. In still another aspect of some embodiments, the substantially horizontal, rotatable, reflux distillation system is portable and deployable. In yet another aspect of some embodiments, the substantially horizontal, rotatable, reflux distillation system is powered by sugar-containing biological waste materials that are boiled in the distillation boiler.

In some embodiments, the reflux distillation system further includes a filtration chamber that is operatively associated with the fluid exit gate, wherein the filtration chamber contains super absorbent polymers or fibers. In another aspect of some embodiments, the super absorbent polymers or fibers includes polyacrylates that filter out residual water and are resistant to effects of ethanol in the distilled fluid. In another aspect of some embodiments, the super absorbent polymers or fibers are monitorable and replaceable to remove residual water from the distilled fluid. In this manner, the super absorbent polymer filters are monitorable in that they may be monitored (either visually or with sensors) to determine when they have reached, or are approaching, the end of their useful life span. Additionally, the super absorbent polymer filters are replaceable in that the used filtration polymers may be swapped with new filtration polymers.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

DETAILED DESCRIPTION

Figure 1:
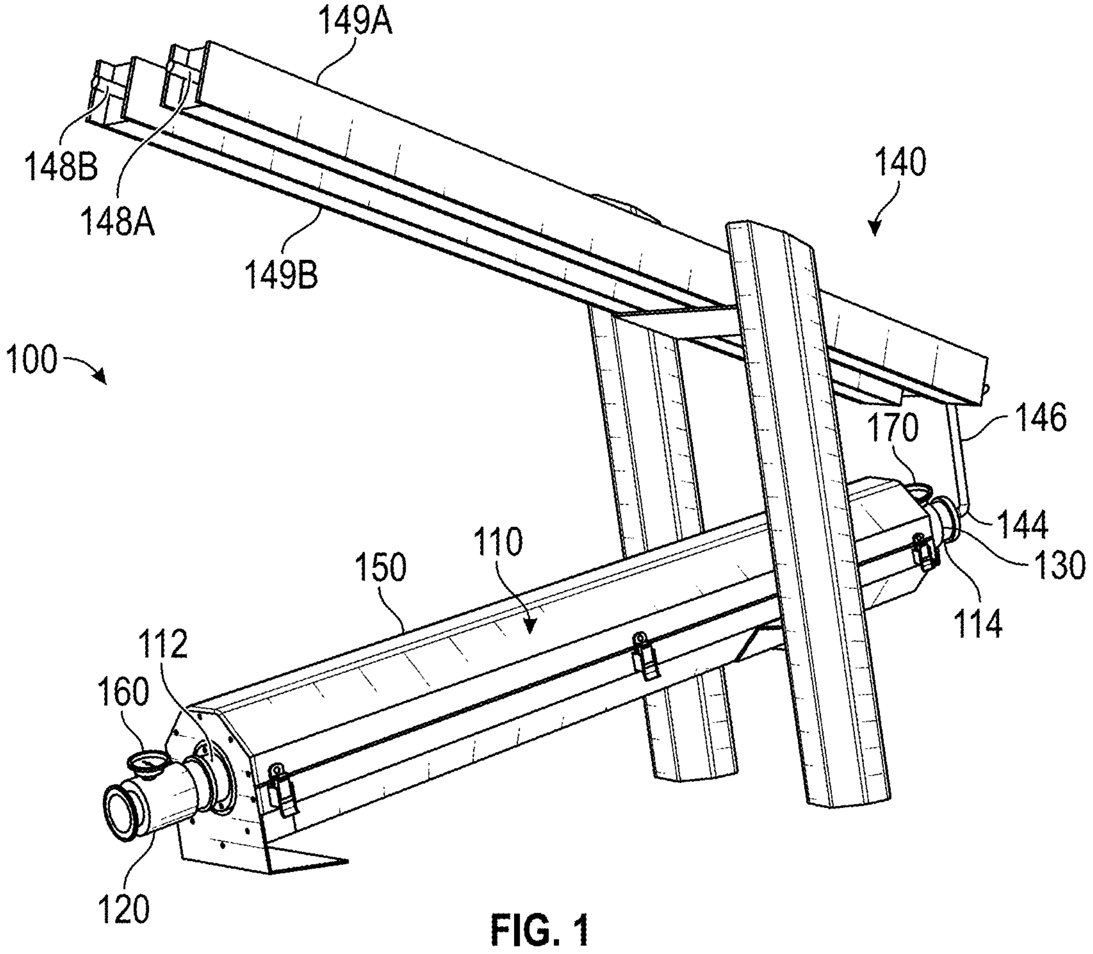
FIG. 1 is a perspective view of an embodiment of a reflux distillation system according to the present disclosure.

Persons of ordinary skill in the art will understand that the present disclosure is illustrative only and not in any way limiting. Other embodiments of the presently disclosed systems, devices, and methods will readily suggest themselves to such skilled persons having the assistance of this disclosure.

Each of the features and teachings disclosed herein can be utilized separately or in conjunction with other features and teachings to provide reflux distillation systems and methods. Representative examples utilizing many of these additional features and teachings, both separately and in combination, are described in further detail with reference to attached FIGS. 1-11. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present devices, systems and methods.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are intended to limit the dimensions and the shapes of the components.

Certain words and phrases used in the specification are set forth as follows. As used throughout this document, including the claims, the singular form "a", "an", and "the" include plural references unless indicated otherwise. Any of the features and elements described herein may be singular. The terms "include" and "comprise," as well as derivatives thereof, mean inclusion without limitation. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Where a range of values is provided, it is understood that each intervening value, to the tenth of the unit of the lower limit unless the context clearly dictates otherwise, is between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the present disclosure.

Figure 2:
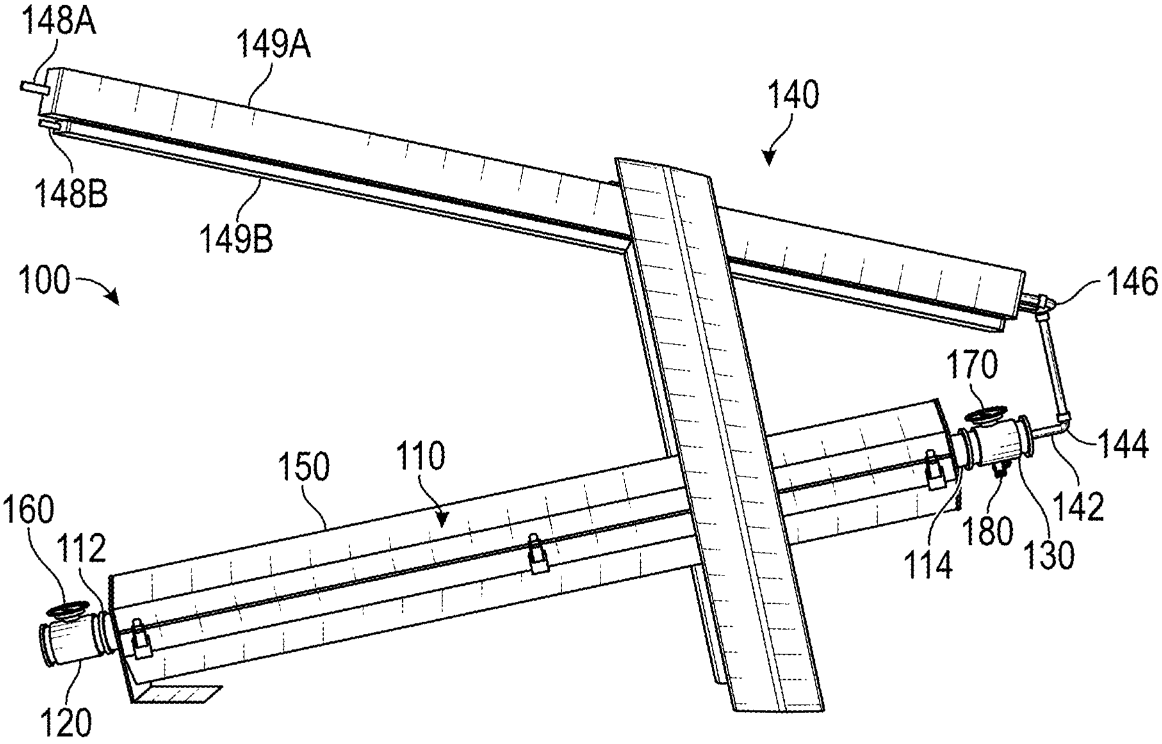
FIG. 2 is a side view of the reflux distillation system of FIG. 1.
Figure 3:
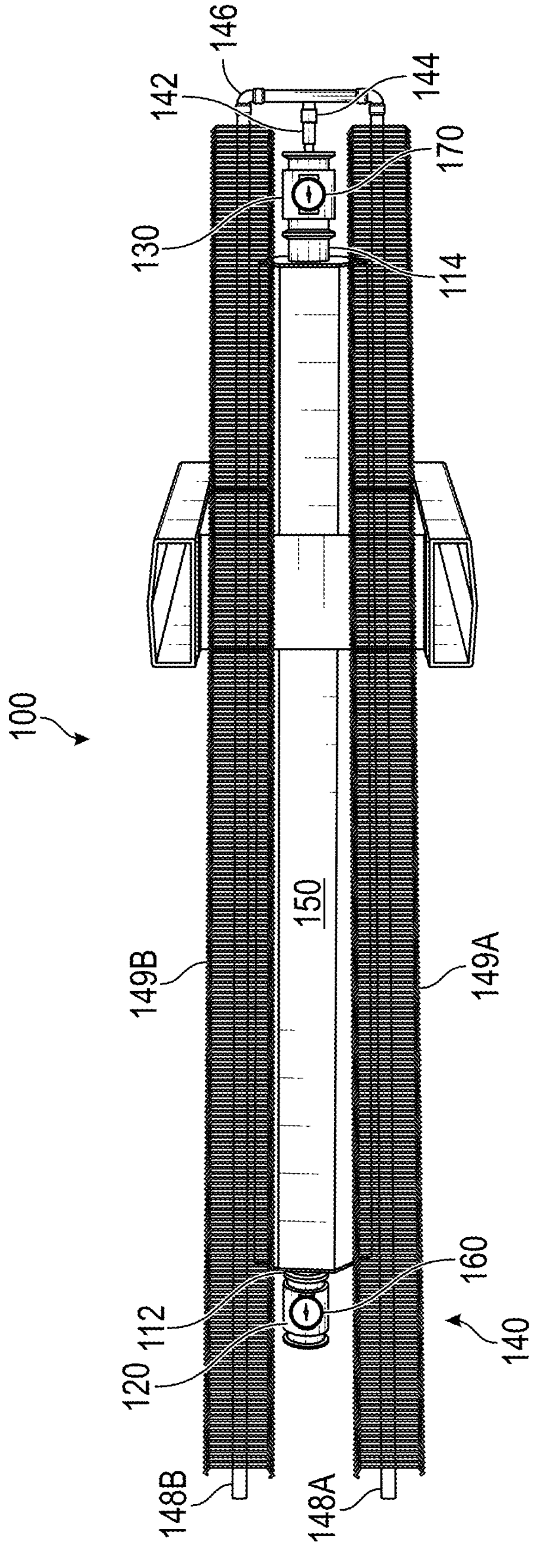
FIG. 3 is a top view of the reflux distillation system of FIG. 1.

Referring now to FIGS. 1-3, one embodiment of the reflux distillation system 100 is shown. In one or more embodiments, the reflux distillation system 100 includes a rotatable, reflux distillation column 110, a lower end transition pipe 120, an upper end transition pipe 130, a rotational drive assembly (shown in FIG. 5), and a vapor reduction system 140. The reflux distillation column 110 is positioned in a substantially horizontal orientation. The substantially horizontal orientation is defined herein as an angle between 10-20 degrees from horizontal. Preferably, the substantially horizontal reflux distillation column 110 is positioned at 12 degrees from horizontal. This selected orientation is in sharp contrast to typical distillation systems that employ vertical distillation columns. As shown in FIG. 1, the reflux distillation column 110 is held in the substantially horizontal angled position by two upright beams and a cross bar. However, in other embodiments, other structural arrangements may be employed to position the substantially horizontal reflux distillation column 110 at the position of 12 degrees from horizontal.

Additionally, the reflux distillation column 110 has a lower end that is a vapor input end and an upper end that is a fluid exit end. The lower end of the reflux distillation column is connected to a lower seal housing 112 that includes inserted seals and bearings (not shown). The upper end of the reflux distillation column 110 is connected to an upper seal housing 114 that includes inserted seals and bearings (not shown). In some embodiments, the reflux distillation column contains distillation packing materials, which induce vapor cycling by adding to the surface area inside the column for increased agitation and condensation. The packing materials may include one or more of copper, stainless rolled mesh, Raschig rings, or other suitable materials. The reflux distillation column 110 is also surrounded by a cover 150. In the embodiments shown in FIGS. 1-3, the cover 150 is shaped as an extended octagon tube; however, in other embodiments other configurations of the cover 150 may be employed.

The lower end transition pipe 120 connects either directly or indirectly with the lower end of the reflux distillation column 110 and the lower seal housing 112. The lower end transition pipe 120 includes a lower thermocouple 160. The upper end transition pipe 130 connects either directly or indirectly with the lower end of the reflux distillation column 110 and the upper seal housing 114. The upper end transition pipe 130 includes an upper thermocouple 170 and a fluid exit gate 180 (described in further detail below with reference to FIG. 6). The upper end transition pipe 130 further connects to the vapor reduction system 140.

Notably, in other embodiments of the reflux distillation system 100, the thermocouples may be replaced or supplemented with a various of thermocouple-like temperature feedback devices along the length of the reflux distillation column 110. Other temperature sensor devices that may be implemented instead of, or in addition to, the thermocouples include thermometers, thermistors, Resistive Temperature Detectors (RTD), thermometer Integrated Circuit (ICs), and the like.

While two thermocouples (i.e., lower thermocouple 160 and an upper thermocouple 170) have been described herein, a larger number of thermocouple may be implements in some embodiments, particularly in embodiments with longer reflux distillation column 110. For example, two thermocouples may be sufficient for temperature monitoring in a 10 foot reflux distillation system 100, while three thermocouples may be appropriate for a 15 foot reflux distillation column 110, with the third thermocouple placed at the midpoint of the reflux distillation column 110. Accordingly, four thermocouples may be appropriate for a 20 foot reflux distillation column 110, with the third and fourth thermocouples equally spaced along the length of the reflux distillation column 110.

Referring now to the vapor reduction system 140 in greater detail, in some embodiments, this system includes several interconnected sub-components. In other embodiments, at least some of these sub-components are combined into a fewer number of interconnected sub-components. For example, in some embodiments, the vapor reduction system 140 includes a piper coupler 142 that connects to a reducer 144. The reducer 144 in turn connect to a distribution Y 146, and the distribution Y 146 connects to the condenser antennae 148A and 148B. As shown most clearly in FIG. 3, the condenser antennae 148A and 148B include cooler fins 149A and 149B that are used to cool the vaper, which travels up inside the condenser antennae 148A and 148B, into condensate that in turn travels back down the vapor reduction system 140 and into the reflux distillation column 110.

In other embodiments, the vapor reduction system 140 has a cooling system that includes a liquid cooled conduction system (not shown) or a liquid cooled evaporation system (not shown), instead of, or in addition to, the cooler fins 149A and 149B. Such a liquid cooled conduction system cools the contents of the condenser antennae 148A and 148B by having a heat conducting liquid travel over the condenser antennae 148A and 148B. Such a liquid cooled evaporation system cools the contents of the condenser antennae 148A and 148B by having the condenser antennae 148A and 148B be moistened with a fluid that evaporates from the condenser antennae 148A and 148B.

Figure 4:
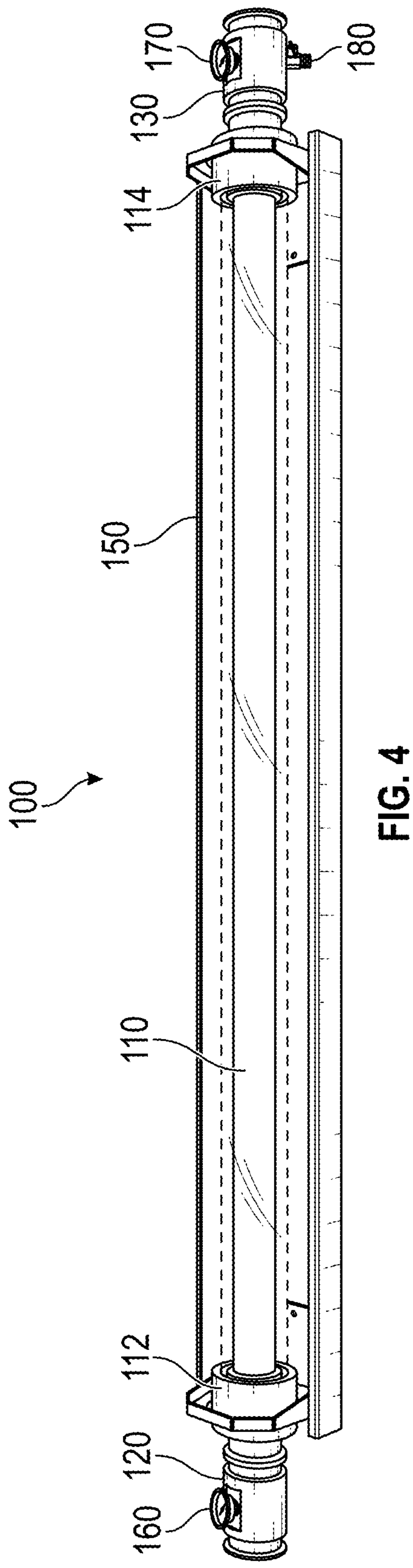
FIG. 4 is a perspective cut-away view of the inside of the reflux distillation column in the reflux distillation system of FIG. 1.

Referring now to FIG. 4, a perspective cut-away view is shown of the reflux distillation column 110 on the inside of the cover 150. As shown in FIG. 4, the left side is the lower end of the reflux distillation column 110 and the right side is the upper end of the reflux distillation column 110. The lower end of the cover 150 terminates around the lower seal housing 112 and the upper end of the cover 150 terminates around the upper seal housing 114. At the lower end of the reflux distillation column 110, the lower end transition pipe 120 is shown connecting to the lower seal housing 112. At the upper end of the reflux distillation column 110, the upper end transition pipe 130 is shown connecting to the upper seal housing 114. Notably, the lower end transition pipe 120 includes a lower thermocouple 160 that provides constant information regarding the temperature of the fluid and vapor mixture at the lower end of the reflux distillation column 110. Additionally, the upper end transition pipe 130 includes an upper thermocouple 170 that provides constant information regarding the temperature of the fluid and vapor mixture at the upper end of the reflux distillation column 110. Furthermore, the upper end transition pipe 130 also includes a fluid exit gate 180 that is positioned opposite of the upper thermocouple 170. The fluid exit gate 180 is described in further detail below with reference to FIG. 6.

Figure 5:
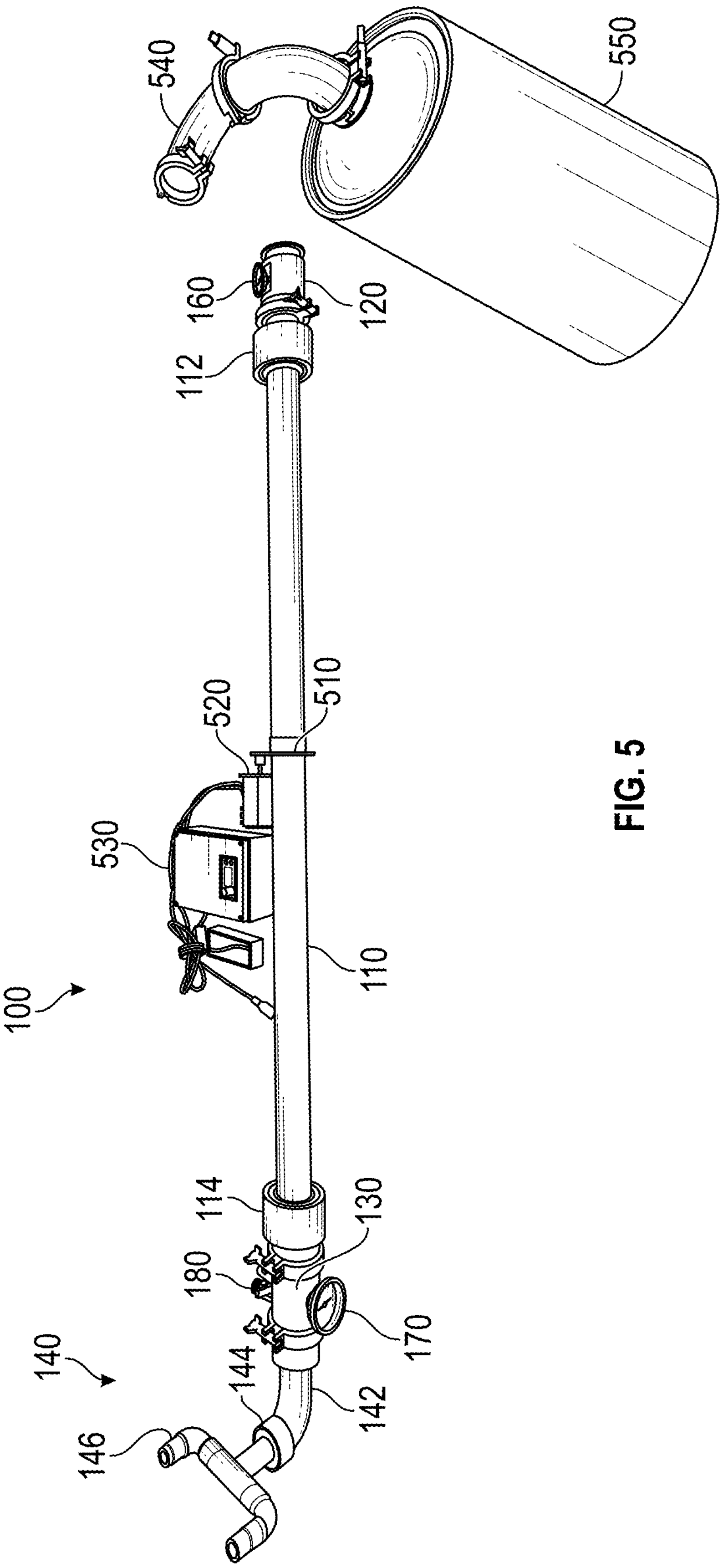
FIG. 5 is an elevated side view of the reflux distillation column in the reflux distillation system of FIG. 1, showing a drive assembly with a gear drive, stepper motor, and control system.

FIG. 5 is an elevated side view of the reflux distillation column 110 in the reflux distillation system of FIG. 1, showing a drive assembly that includes a gear drive 510, a stepper motor 520, and a control system 530 that are used to rotate the reflux distillation column 110. The gear drive 510 is connected to the reflux distillation column 110 as shown in FIG. 5. The gear drive 510 is also driven by the stepper motor 520 that interacts with the gear drive 510 under the control of the control system 530. The control system 530 and stepper motor 520 are battery powered in some embodiments. In other embodiments, the control system 530 and stepper motor 520 are solar powered with one or more photovoltaic (PV) panels. In still other embodiments, other varieties of power generation are employed. Furthermore, in some embodiments, one or more belt drives (not shown) may be used to rotate the reflux distillation column 110 instead of a gear drive 510.

As shown in FIG. 5, the drive assembly rotates the reflux distillation column 110 while the lower seal housing 112 and the upper seal housing 114 enable the lower end transition pipe 120 (including the lower thermocouple 160) and the upper end transition pipe 130 (including the upper thermocouple 170 and the fluid exit gate 180) to remain fixed (i.e., not rotating). The lower end transition pipe 120 is further shown in preparation for connection to the boiler connection pipe 540. The boiler connection pipe 540 in turn connects to the top of the distillation boiler 550.

As shown in FIG. 5 at the other end of the reflux distillation column 110, the upper end transition pipe 130 includes the upper thermocouple 170 and the fluid exit gate 180. The upper end transition pipe 130 also connects to the vapor reduction system 140. The vapor reduction system 140 includes a piper coupler 142 that connects to a reducer 144. The reducer 144 in turn connects to a distribution Y 146. As shown in FIGS. 1-3 (but not in FIG. 5), the distribution Y 146 connects to the condenser antennae 148A and 148B, which include cooler fins 149A and 149B.

The control system 530 is used to control the rotational speed of the reflux distillation column 110. In some embodiments, the desired rotational speed of the reflux distillation column 110 is determined based at least in part by an overall encapsulated volume of the diameter of the reflux distillation column and the length of the reflux distillation column. In this manner, the rotational speed of the reflux distillation column 110 is optimized to rotate at a speed calculated to average the centripetal force (i.e., force directed radially inward towards the center of rotation) and the apparent centrifugal force (i.e., force directed radially outward away from the center of rotation), thereby maximizing the ethanol vapor in the center of the reflux distillation column 110.

Figure 6:
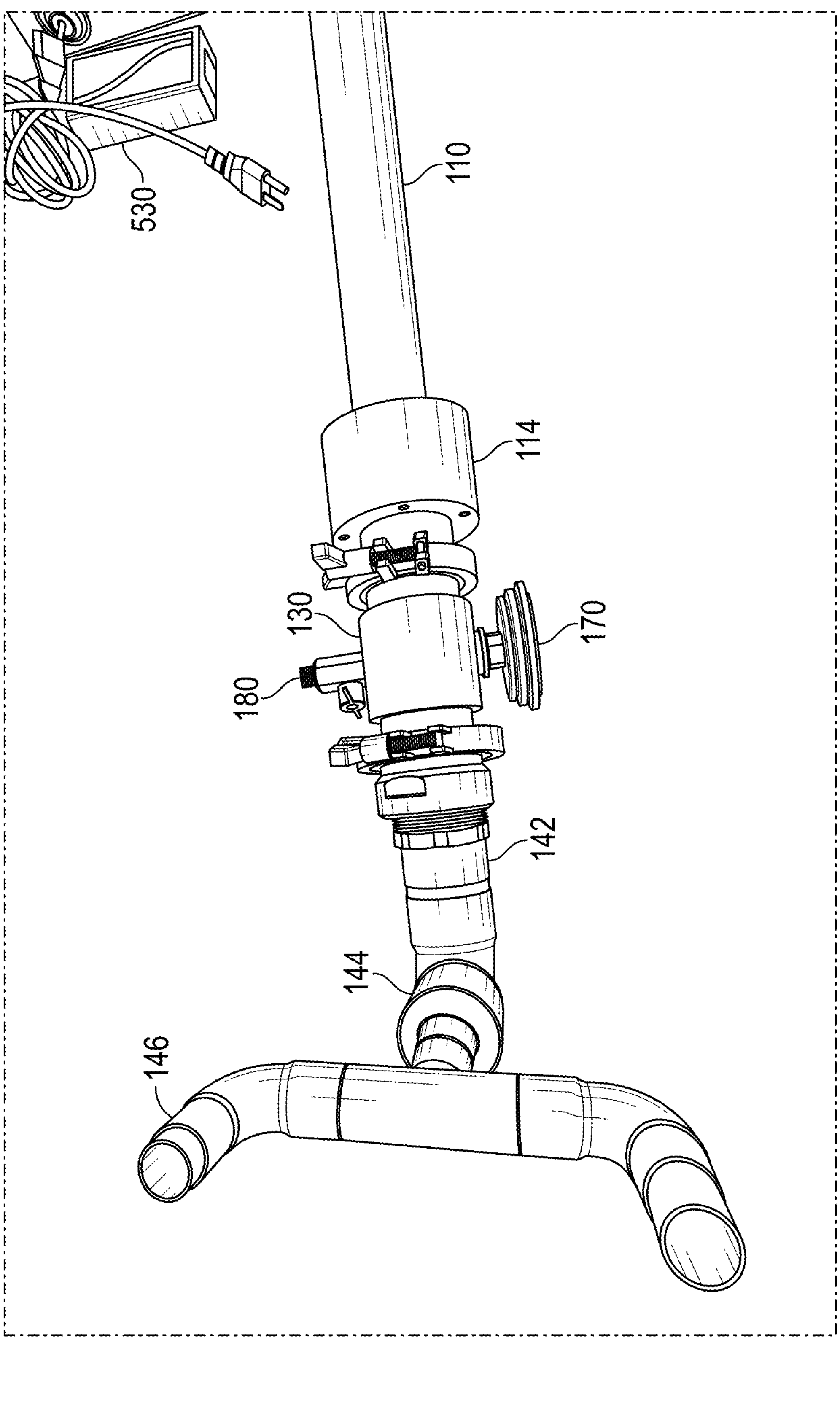
FIG. 6 is an elevated perspective view of the upper end transition pipe including an upper thermocouple and a fluid exit gate, as well as the upper seal housing attached to the reflux distillation column.

Referring now to FIG. 6, an elevated perspective view of the upper end transition pipe 130 is shown that is a close-up of FIG. 5. FIG. 6 shows a more detailed view of the upper end transition pipe 130 that includes the upper thermocouple 170 and the fluid exit gate 180. The upper seal housing 114 is shown attached to the reflux distillation column 110 at one end, and attached to the upper end transition pipe 130 at the other end. As shown in FIGS. 5 and 6, the upper end transition pipe 130 also connects to the vapor reduction system 140, which includes the piper coupler 142, the reducer 144, and the distribution Y 146.

The fluid exit gate 180 is controlled by dynamic linear feedback temperature control that keeps the fluid exit gate in a closed state until temperature monitoring equipment (e.g., the lower thermocouple 160 and the upper thermocouple 170) determines that the entirety of an internal volume of the reflux distillation column 110 is homogenized in an azeotropic temperature state. At this point, the fluid exit gate 180 moves into an open state, enabling the condensate, which has been ideally distilled to 95.5% ethanol in a single pass, to exit the reflux distillation column 110 into a receiving container in a fluid state. The fluid exit gate 180 remains in an open state until the azeotropic temperature state of the reflux distillation column 110 is no longer maintained (i.e., as determined by the lower and upper thermocouples 160 and 170), and then the fluid exit gate 180 moves back into a closed state.

Otherwise stated, in some embodiments of the reflux distillation system 100, the lower and upper thermocouples 160 and 170 are used as feedback and gate control mechanisms. The reflux distillation system 100 plots the internal temperature of the reflux distillation column 110, leaving it in a closed off state until such time as the entirety of the internal volume is homogenized in an azeotropic temperature state, or equilibration. Only at that time is the fluid exit gate 180 opened to allow the pure distillate to leave the reflux distillation column 110. In some embodiments, the fluid exit gate 180 is a DEMA normally closed solenoid valve that is triggered to stay open only during an equilibrium period through the feedback loop. The feedback temperature controls remain active throughout the distillation process and where distillation "heads" and distillation "tails" in the process of azeotrope distillation will separate out at lower temperatures. In this manner, "heads" refers to impurities at the front end of the process and "tails" refers to impurities at the back end of the process. This temperature control ensures that only "pure" azeotropic ethanol temperature separations occur to the exclusion of any other molecular formations. In this manner, the ethanol vapor is forced to continue cycling until such time as the set target temperature is equalized from top and bottom of the reflux distillation column 110.

Only an equilibration of the interior temperature of the reflux distillation column 110 triggers the fluid exit gate 180 to an open position delivering the maximum distillation condition of 95.5% ethanol. At the end of the distillation cycle when the converted ethanol is depleted, and the azeotrope complete, the lower and upper thermocouples 160 and 170 will indicate differential temperature read-outs at the entrance and exit of the reflux distillation column 110, thus shutting off the fluid exit gate 180, and preventing the presence of distillation "tails" impurities from inclusion.

Figure 7:
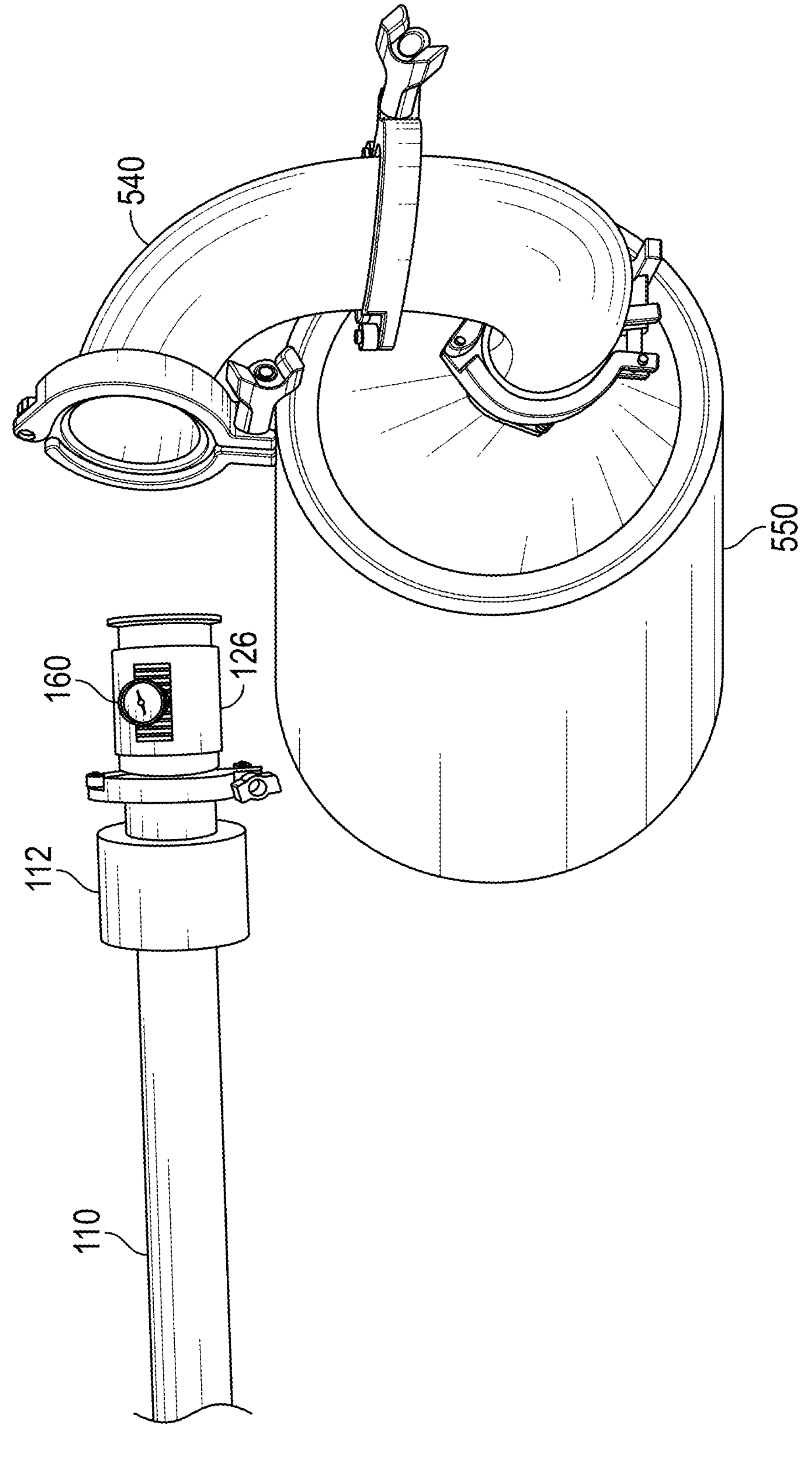
FIG. 7 is an elevated perspective view of the lower end transition pipe including a lower thermocouple, as well as the lower seal housing attached to the reflux distillation column, and the boiler connection piping.

Referring now to FIG. 7, an elevated perspective view of the lower end transition pipe 120 is shown that is a close-up of FIG. 5. FIG. 7 shows a more detailed view of the lower end transition pipe 120 that includes the lower thermocouple 160. The lower seal housing 112 is shown attached to the reflux distillation column 110 at one end, and attached to the lower end transition pipe 120 at the other end. As shown in FIGS. 5 and 7, the lower end transition pipe 120 is further shown in preparation for connection to the boiler connection pipe 540. The boiler connection pipe 540 in turn connects to the top of the distillation boiler 550. The distillation boiler 550 produces vapor that is heated to between 70-100 degrees Celsius. Preferably, the distillation boiler 550 produces vapor that is heated to 95 degrees Celsius.

Figure 8:
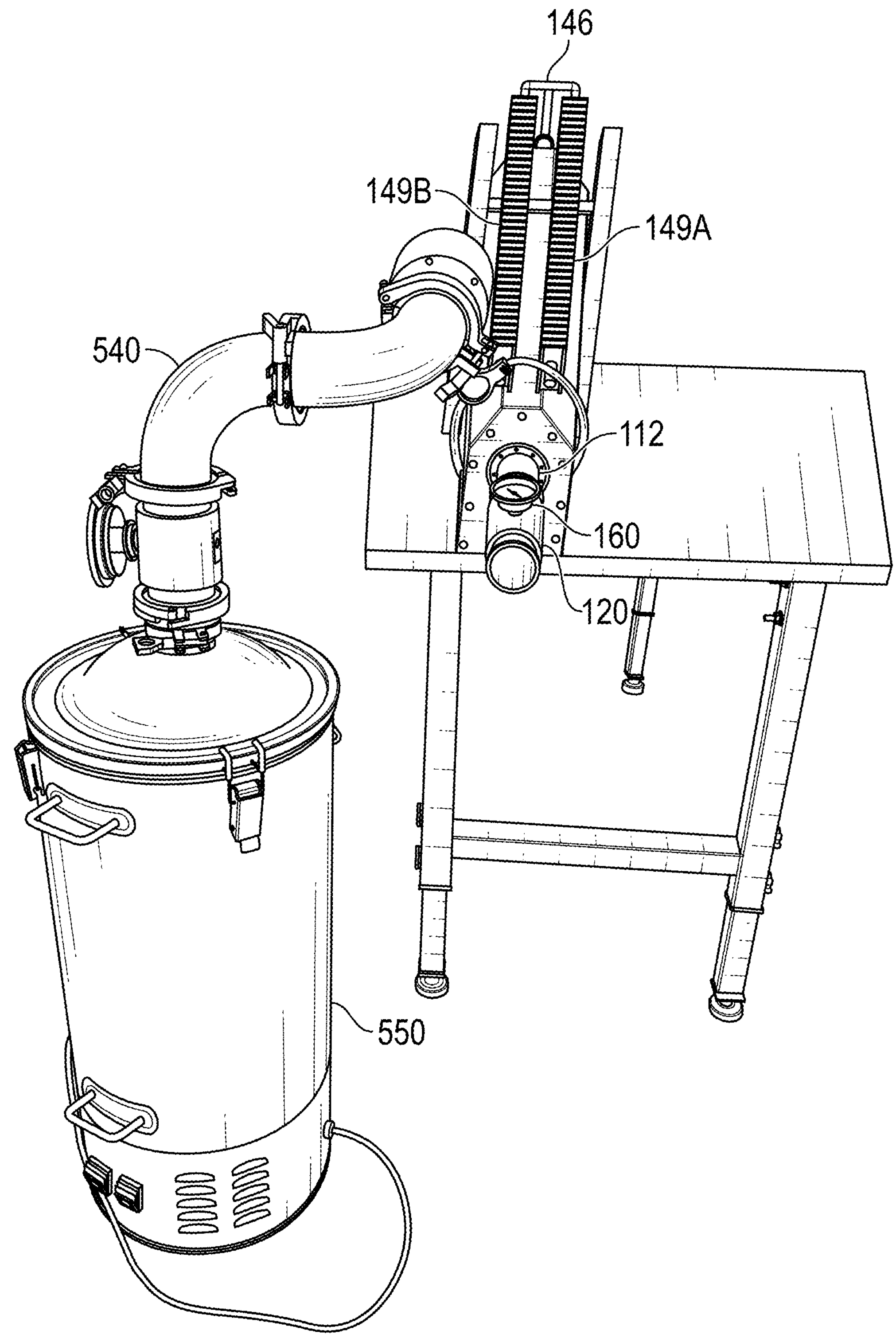
FIG. 8 is an elevated end view of the lower end transition pipe, the boiler connection piping, and the distillation boiler.

FIG. 8 is an elevated end view of the lower end transition pipe 120 of the reflux distillation system 100, the distillation boiler 550, and the boiler connection piping 540. As discussed with reference to FIG. 7, the lower end transition pipe 120 includes the lower thermocouple 160. The lower seal housing 112 is attached to the reflux distillation column 110 at one end, and attached to the lower end transition pipe 120 at the other end. The lower end transition pipe 120 is further shown in preparation for connection to the boiler connection pipe 540. The boiler connection pipe 540 in turn connects to the distillation boiler 550. Notably, the substantially horizontal, rotatable, reflux distillation system 100 is extremely "green" (e.g., non-polluting, with little to no emissions, sustainable, etc.) in that for fuel it burns any locally sourced, sugar-containing biological waste materials (e.g., any vegetation waste, discarded leftover food waste, etc.). These biological waste materials are boiled in the distillation boiler 550. As will be described below with reference to FIG. 9, in some embodiments, the distillation boiler 550 is powered by a closed loop solar heating system 900, which completes the sustainability cycle provided by the reflux distillation system 100.

Figure 9:
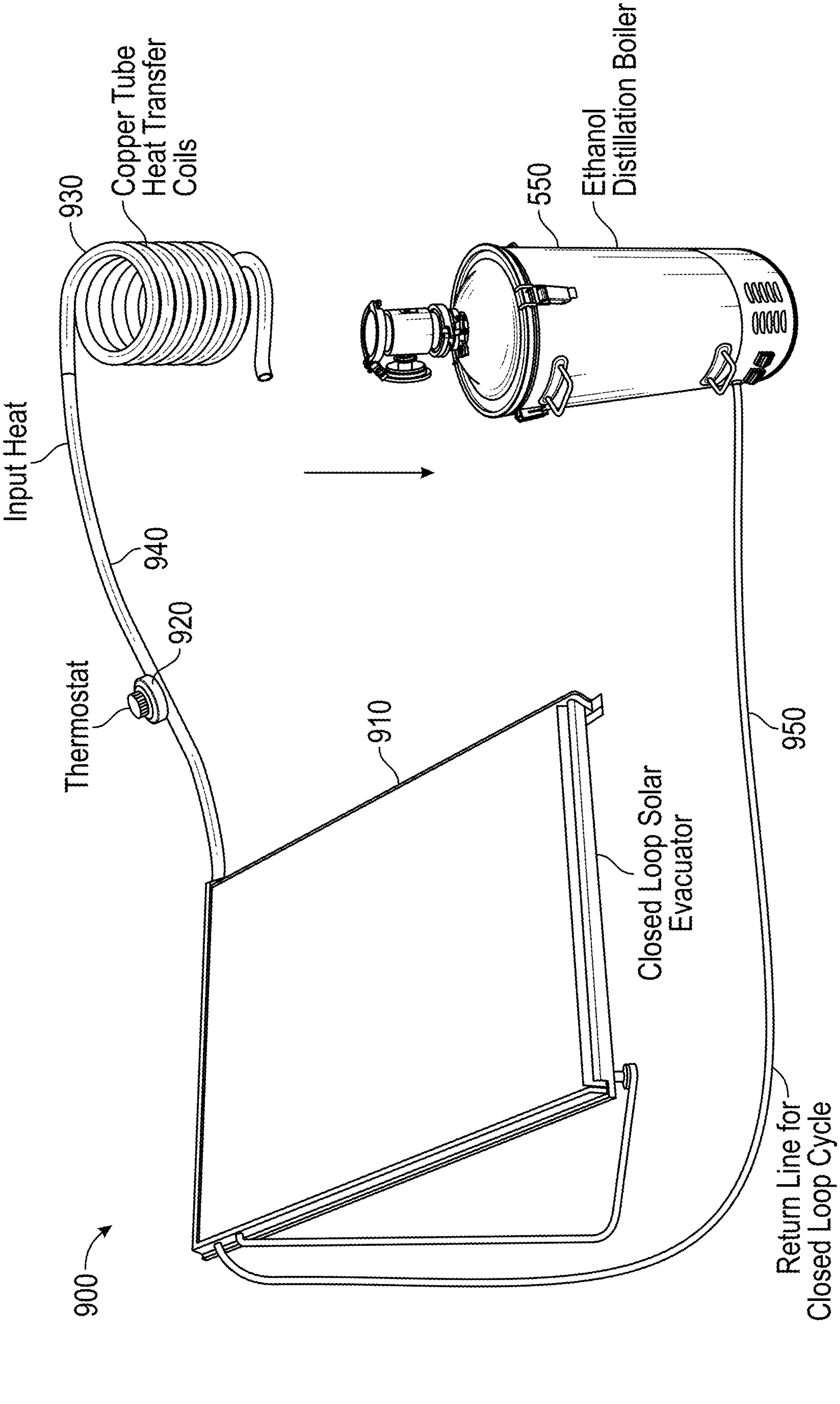
FIG. 9 is a perspective view of a closed loop solar heating system for heating the distillation boiler associated with the reflux distillation system.

FIG. 9 is a perspective view of a closed loop solar heating system 900 for heating the distillation boiler 550 associated with the reflux distillation system 100. The closed loop solar heating system 900 includes a solar collector/evacuator 910, a thermostat 920, heat transfer coils 930, an input heat line 940 that connects the solar collector/evacuator 910 to the distillation boiler 550, heat transfer coils 930 that are contained in the distillation boiler 550, and a return line 950 that connects the distillation boiler 550 back to the solar collector/evacuator 910. In some embodiments, glycol (or another appropriate liquid with high heat transfer capabilities) is heated in the solar collector/evacuator 910 and has its temperature measured by the thermostat 920. The heated and temperature-controlled glycol then travels down the input heat line 940 to the heat transfer coils 930 that are contained in the distillation boiler 550. In one embodiment, the heat transfer coils 930 are copper or another material with high heat transfer capabilities. Inside the distillation boiler 550, the heat from the glycol is transferred to the biological waste material being boiled. This glycol, which has had its heat transferred to the biological waste material being boiled, then travels back to the solar collector/evacuator 910 to be reheated again and continue the closed loop solar heating cycle. In other embodiments of the reflux distillation system 100, a different solar heating arrangement may be employed. In still other embodiments of the reflux distillation system 100, batteries or other power generation systems may be used to power the distillation boiler 550.

In one or more embodiments of the substantially horizontal, rotatable, reflux distillation system 100, the system achieves greater than 90% distillation in one pass. In more preferred embodiments of the substantially horizontal, rotatable, reflux distillation system 100, the system achieves 95.5% distillation in one pass. Unlike standard distillation systems that are large and stationary, the substantially horizontal, rotatable, reflux distillation system 100 is portable and deployable due to its extremely high efficiency.

In some embodiments, the reflux distillation system further includes a filtration chamber (not shown) that is operatively associated with the fluid exit gate. In some such embodiments, the filtration chamber contains super absorbent polymers (e.g., polyacrylates) or technology fibers. In practice, the super absorbent polymers filter out residual water and are resistant to effects of ethanol in the distilled fluid (i.e., the super absorbent polymers technology fibers do not absorb ethanol). In one or more embodiments, the super absorbent polymers or technology fibers are monitorable and replaceable to remove residual water from the distilled fluid. In this manner, the super absorbent polymer filters are monitorable in that they may be monitored (either visually or with sensors) to determine when they have reached, or are approaching, the end of their useful life span. Additionally, the super absorbent polymer filters are replaceable in that the used filtration polymers may be swapped with new filtration polymers. Since these super absorbent polymers (e.g., polyacrylate materials, like diaper fill material) filter out most or all of any remaining water, while enabling the ethanol distilled fluid to pass through, this enables a 95.5% pure ethanol solution to have its remaining 4.5% of water extracted. Accordingly, the final end product of this ethanol distilled fluid is a more widely usable material for fuel, chemistry, and pharmaceuticals, due to the removal of the water from the final end product.

Figure 10:
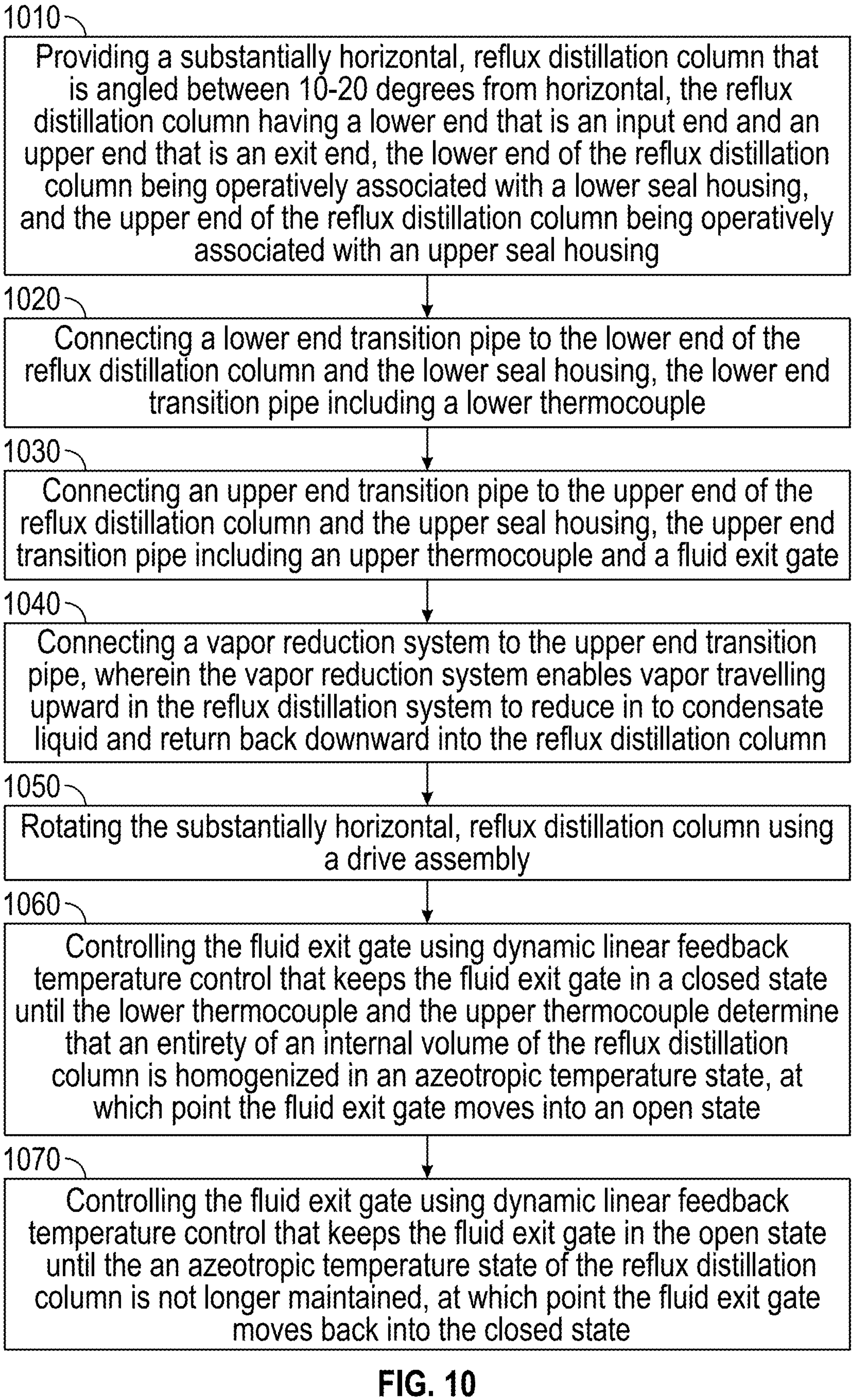
FIG. 10 is a logic diagram showing the operations of the reflux distillation method.

FIG. 10 is a logic diagram showing the method for substantially horizontal, reflux distillation. As shown in FIG. 10, at operation 1010, the method includes providing a substantially horizontal, reflux distillation column. The substantially horizontal is defined as angled between 10-20 degrees from horizontal. The reflux distillation column has a lower end that is an input end and an upper end that is an exit end. The lower end of the reflux distillation column is operatively associated with a lower seal housing. The upper end of the reflux distillation column is operatively associated with an upper seal housing. At operation 1020, the method includes connecting a lower end transition pipe to the lower end of the reflux distillation column and the lower seal housing, the lower end transition pipe including a lower thermocouple. At operation 1030, the method includes connecting an upper end transition pipe to the upper end of the reflux distillation column and the upper seal housing, the upper end transition pipe including an upper thermocouple and a fluid exit gate. At operation 1040, the method includes connecting a vapor reduction system to the upper end transition pipe, wherein the vapor reduction system enables vapor travelling upward in the reflux distillation system to reduce into condensate liquid and return back downward into the reflux distillation column.

At operation 1050, the method includes rotating the substantially horizontal, reflux distillation column using a drive assembly. At operation 1060, the method includes controlling the fluid exit gate using dynamic linear feedback temperature control that keeps the fluid exit gate in a closed state until the lower thermocouple and the upper thermocouple determine that an entirety of an internal volume of the reflux distillation column is homogenized in an azeotropic temperature state, at which point the fluid exit gate moves into an open state. At operation 1070, the method includes controlling the fluid exit gate using dynamic linear feedback temperature control that keeps the fluid exit gate in the open state until the azeotropic temperature state of the reflux distillation column is no longer maintained, at which point the fluid exit gate moves back into the closed state.

Figure 11:
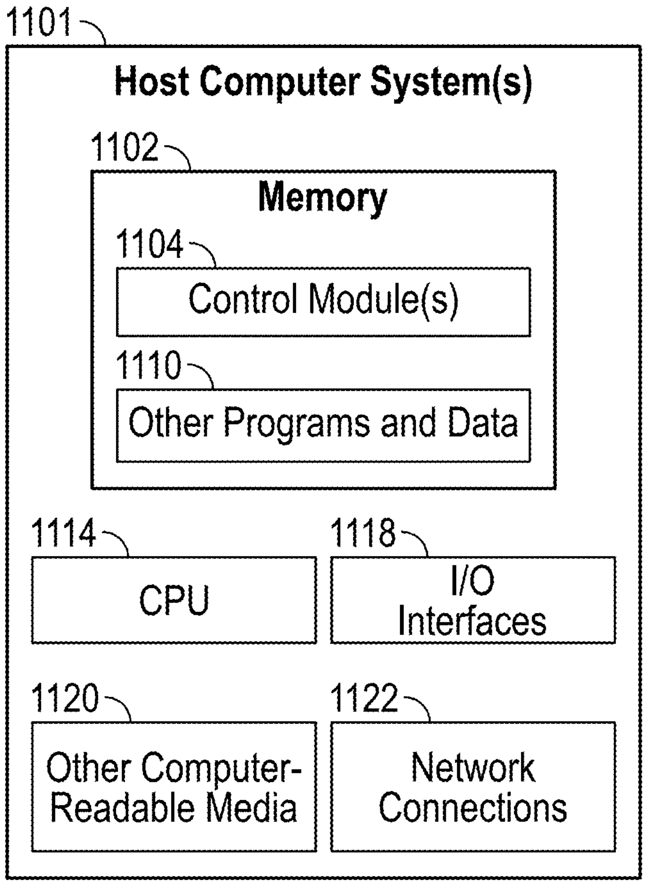
FIG. 11 shows a system diagram that describes an example implementation of a computing system(s) for implementing embodiments described herein.

FIG. 11 shows a system diagram that describes an example implementation of a computing system(s) for implementing embodiments described herein. The functionality described herein for rotating the substantially horizontal, rotatable, reflux distillation system 100, can be implemented either on dedicated hardware, as a software instance running on dedicated hardware, or as a virtualized function instantiated on an appropriate platform, e.g., a cloud infrastructure.

In particular, shown is example host computer system(s) 1101. For example, such host computer system(s) 1101 may represent those in various data centers and cell sites shown and/or described herein that host the functions, components, microservices and other aspects described herein. In some embodiments, one or more special-purpose computing systems may be used to implement the functionality described herein. Accordingly, various embodiments described herein may be implemented in software, hardware, firmware, or in some combination thereof. Host computer system(s) 1101 may include memory 1102, one or more central processing units (CPUs) 1114, I/O interfaces 1118, other computer-readable media 1120, and network connections 1122.

Memory 1102 may include one or more various types of non-volatile and/or volatile storage technologies. Examples of memory 1102 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 1102 may be utilized to store information, including computer-readable instructions that are utilized by CPU 1114 to perform actions, including those of embodiments described herein.

Memory 1102 may have stored thereon control module(s) 1104. The control module(s) 1104 may be configured to implement and/or perform some or all of the functions of the systems, components and modules described herein for rotating the substantially horizontal, rotatable, reflux distillation system 100 at the optimal rotational speed. Memory 1102 may also store other programs and data 1110, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 1122 are configured to communicate with other computing devices to facilitate the functionality described herein. In various embodiments, the network connections 1122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1118 may include video interfaces, other data input or output interfaces, or the like. Other computer-readable media 1120 may include other types of stationary or removable computer-readable media, such as removable flash drives, external hard drives, or the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described embodiments, but should be defined only in accordance with the following claims and their equivalents.

The invention claimed is:

1. A substantially-horizontal, rotatable, reflux distillation system, comprising:

a substantially-horizontal, rotatable, reflux distillation column, wherein substantially horizontal is defined as angled between 10-20 degrees from horizontal, wherein the reflux distillation column has a lower end that is an input end and an upper end that is an exit end, wherein the lower end of the reflux distillation column is operatively associated with a lower seal housing that includes inserted seals and bearings, and wherein the upper end of the reflux distillation column is operatively associated with an upper seal housing that includes inserted seals and bearings;

a lower end transition pipe operatively associated with the lower end of the reflux distillation column and the lower seal housing, the lower end transition pipe including a lower thermocouple;

an upper end transition pipe operatively associated with the upper end of the reflux distillation column and the upper seal housing, the upper end transition pipe including an upper thermocouple and a fluid exit gate, wherein the fluid exit gate is controlled by dynamic linear feedback temperature control that keeps the fluid exit gate in a closed state until temperature monitoring using the lower thermocouple and the upper thermocouple determines that an entirety of an internal volume of the reflux distillation column is homogenized in an azeotropic temperature state, at which point the fluid exit gate moves into an open state, until the azeotropic temperature state of the reflux distillation column is no longer maintained and the fluid exit gate moves back into a closed state;

a drive assembly operatively associated with the reflux distillation column that rotates the reflux distillation column; and a vapor reduction system operatively associated with the upper end transition pipe, wherein the vapor reduction system enables vapor travelling upward in the reflux distillation system to reduce into condensate liquid and return back downward into the reflux distillation column.

2. The system of claim 1, wherein substantially-horizontal is defined as 12 degrees from horizontal.

3. The system of claim 1, wherein the reflux distillation column contains packing materials, which add to a surface area inside the column for agitation and condensation.

4. The system of claim 3, wherein the packing materials include one or more of copper, stainless rolled mesh, and Raschig rings.

5. The system of claim 1, wherein the lower end transition pipe is operatively associated with a distillation boiler.

6. The system of claim 5, wherein the boiler produces vapor that is heated to between 70-100 degrees Celsius.

7. The system of claim 5, wherein the boiler produces vapor that is heated to 95 degrees Celsius.

8. The system of claim 5, wherein the vapor produced by the boiler travels upward in the reflux distillation column towards the condenser system until it the vapor cools into condensate, and gravity causes the condensate to travel back downward in the reflux distillation column towards the boiler.

9. The system of claim 1, wherein the drive assembly operatively associated with the reflux distillation column includes one or more of a gear drive and a belt drive to rotate the reflux distillation column, wherein the drive assembly further includes a stepper motor to rotate the reflux distillation column.

10. The system of claim 1, wherein the drive assembly operatively associated with the reflux distillation column includes a control system to control the rotational speed of the column.

11. The system of claim 1, wherein the rotational speed of the reflux distillation column is determined based at least in part by an overall encapsulated volume of a diameter of the reflux distillation column and a length of the reflux distillation column to maximize the vapor in a center of the reflux distillation column.

12. The system of claim 1, wherein the vapor reduction system includes a distribution hub and one or more condenser antennae that connect with the distribution hub.

13. The system of claim 12, wherein the vapor reduction system includes a cooling system that is operatively associated with the one or more condenser antennas, the cooling system including one of more of cooling fins, a liquid cooled conduction system, or a liquid cooled evaporation system.

14. The system of claim 1, further comprising a closed loop solar heating system that heats a boiler, wherein the closed loop solar heating system includes a solar collector/evacuator, a thermostat, heat transfer coils, a distillation boiler that contains the heat transfer coils, an input heat line that connects the solar collector/evacuator to the distillation boiler, and a return line that connects the distillation boiler back to the solar collector/evacuator.

15. The system of claim 1, wherein the substantially-horizontal, rotatable, reflux distillation system achieves greater than 90% distillation in one pass.

16. The system of claim 1, wherein the substantially-horizontal, rotatable, reflux distillation system achieves 95.5% distillation in one pass.

17. The system of claim 1, wherein the substantially-horizontal, rotatable, reflux distillation system is portable and deployable.

18. The system of claim 1, wherein the substantially-horizontal, rotatable, reflux distillation system is powered by sugar-containing biological waste materials that are boiled in a distillation boiler.

19. A method for distillation using a substantially-horizontal, rotatable, reflux distillation system, the method comprising:

providing a substantially-horizontal, reflux distillation column, wherein substantially horizontal is defined as angled between 10-20 degrees from horizontal, wherein the reflux distillation column has a lower end that is an input end and an upper end that is an exit end, wherein the lower end of the reflux distillation column is operatively associated with a lower seal housing, and wherein the upper end of the reflux distillation column is operatively associated with an upper seal housing;

connecting a lower end transition pipe to the lower end of the reflux distillation column and the lower seal housing, the lower end transition pipe including a lower thermocouple;

connecting an upper end transition pipe to the upper end of the reflux distillation column and the upper seal housing, the upper end transition pipe including an upper thermocouple and a fluid exit gate;

connecting a vapor reduction system to the upper end transition pipe, wherein the vapor reduction system enables vapor travelling upward in the reflux distillation system to reduce into condensate liquid and return back downward into the reflux distillation column;

rotating the substantially-horizontal, reflux distillation column using a drive assembly;

controlling the fluid exit gate using dynamic linear feedback temperature control that keeps the fluid exit gate in a closed state until the lower thermocouple and the upper thermocouple determine that an entirety of an internal volume of the reflux distillation column is homogenized in an azeotropic temperature state, at which point the fluid exit gate moves into an open state; and controlling the fluid exit gate using dynamic linear feedback temperature control that keeps the fluid exit gate in the open state until the azeotropic temperature state of the reflux distillation column is no longer maintained, at which point the fluid exit gate moves back into the closed state.

20. An oblique angled, rotatable, reflux distillation system, comprising:

an oblique angled, rotatable, reflux distillation column, wherein oblique angled is defined as angled between 10-20 degrees from horizontal, wherein the reflux distillation column has a lower end that is a vapor input end and an upper end that is a fluid exit end, wherein the lower end of the reflux distillation column is operatively associated with a lower seal housing, and wherein the upper end of the reflux distillation column is operatively associated with an upper seal housing;

a lower end transition pipe operatively associated with the lower end of the reflux distillation column and the lower seal housing, the lower end transition pipe including a lower temperature measurement device;

an upper end transition pipe operatively associated with the upper end of the reflux distillation column and the upper seal housing, the upper end transition pipe including an upper temperature measurement device and a fluid exit gate;

a rotational drive assembly operatively associated with the reflux distillation column that rotates the reflux distillation column; and a vapor reduction system operatively associated with the upper end transition pipe, wherein the vapor reduction system causes vapor travelling upward in the reflux distillation system to reduce into condensate liquid and return back downward into the reflux distillation column, wherein distilled fluid only exits the reflux distillation system out of the fluid exit gate when an azeotropic temperature state has been reached within the reflux distillation column, as determined by the lower and upper lower temperature measurement devices.

21. The system of claim 20, further comprising: a filtration chamber that is operatively associated with the fluid exit gate, wherein the filtration chamber contains super absorbent polymers.

22. The system of claim 21, wherein the super absorbent polymers includes polyacrylates that filter out residual water and are resistant to effects of ethanol in the distilled fluid, and wherein the super absorbent polymers are monitorable and replaceable to remove residual water from the distilled fluid.

* * * * *